United States Patent
Kim et al.

(10) Patent No.: US 8,488,979 B2
(45) Date of Patent: Jul. 16, 2013

(54) MULTI-LEVEL POLARIZATION MULTI-LEVEL PHASE MODULATOR

(75) Inventors: Inwoong Kim, Allen, TX (US); Takao Naito, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 323 days.

(21) Appl. No.: 12/646,792

(22) Filed: Dec. 23, 2009

(65) Prior Publication Data

US 2011/0150479 A1    Jun. 23, 2011

(51) Int. Cl.
*H04B 10/04*    (2006.01)
*H04B 10/12*    (2006.01)

(52) U.S. Cl.
USPC .......................... 398/185; 398/184; 398/188

(58) Field of Classification Search
USPC .......................................... 398/182–185, 188
See application file for complete search history.

(56) References Cited

U.S. PATENT DOCUMENTS

| | | | | |
|---|---|---|---|---|
| 4,674,105 A * | 6/1987 | Suzuki | | 375/324 |
| 5,101,450 A * | 3/1992 | Olshansky | | 385/3 |
| 5,327,511 A * | 7/1994 | Heismann et al. | | 385/1 |
| 5,344,099 A * | 9/1994 | Pittman et al. | | 244/3.13 |
| 5,416,628 A * | 5/1995 | Betti et al. | | 398/185 |
| 5,930,150 A * | 7/1999 | Cohen et al. | | 716/102 |
| 6,650,846 B1 * | 11/2003 | Ito | | 398/184 |
| 6,704,469 B1 * | 3/2004 | Xie et al. | | 385/11 |
| 7,492,986 B1 * | 2/2009 | Kelly | | 385/16 |
| 2004/0129867 A1* | 7/2004 | Mackey | | 250/225 |
| 2004/0184819 A1* | 9/2004 | Vassilieva et al. | | 398/188 |
| 2004/0208646 A1 | 10/2004 | Choudhary et al. | | 398/188 |
| 2005/0046860 A1* | 3/2005 | Waagaard et al. | | 356/478 |
| 2005/0207759 A1* | 9/2005 | Kim et al. | | 398/183 |
| 2006/0045413 A1* | 3/2006 | Weigert | | 385/15 |
| 2008/0152361 A1* | 6/2008 | Chen et al. | | 398/205 |
| 2008/0181620 A1* | 7/2008 | Sasaki | | 398/198 |
| 2008/0297768 A1* | 12/2008 | Szafraniec et al. | | 356/73 |
| 2009/0022498 A1* | 1/2009 | Shibutani | | 398/152 |

OTHER PUBLICATIONS

Benedetto et al.; "Multilevel Polarization Modulation Using a Specifically Designed LiNbO3 Device"; IEEE Photonics Technology Letters, vol. 6, No. 8; pp. 949-951.*

Betti et al."Homodyne Optical Coherent Systems Based on Polarization Modulation", Journal of Lightwave Technology, vol. 9, No. 10; pp. 1314-1320.*

Data. (2001). In Hargrave's Communications Dictionary, Wiley. Retrieved from http://www.credoreference.com/entry/hargravecomms/data.*

(Continued)

*Primary Examiner* — Nathan Curs
*Assistant Examiner* — Tanya Ngo
(74) *Attorney, Agent, or Firm* — Baker Botts L.L.P.

(57) ABSTRACT

An apparatus for use with an optical computation system may comprise a monolithic device with no free space optical components and may include a phase modulator and a polarization modulator. The phase modulator may be configured to receive a beam of light and two digital data streams and operable to modulate the phase of the beam of light to at least four phase states, the at least four phase states representing the two digital data streams. The polarization modulator may be configured to receive two additional digital data streams and the modulated beam of light from the phase modulator and operable to modulate the polarization of the beam of light to at least four polarization states, the at least four polarization states representing the two additional digital data streams.

18 Claims, 5 Drawing Sheets

OTHER PUBLICATIONS

Aoki et al.; "Low Half-Wave Voltage X-Cut Thin LiNbO3 Sheet Optical Phase Modulator With Asymmetric Coplanar Waveguide Electrode"; IEEE Photonics Technology Letters, vol. 20, No. 21; pp. 1811-1813, Nov. 1, 2008.

Betti et al.; "A Novel Multilevel Coherent Optical System: 4-Quadrature Signaling"; Journal of Lightwave Technology, vol. 9, No. 4; pp. 514-523, Apr. 1991.

Betti et al.; "Multilevel Coherent Optical System Based on Stokes Parameters Modulation"; Journal of Lightwave Technology, vol. 8, No. 7; pp. 1127-1136, Jul. 1990.

Hu et al.; "4-Level Direct-Detection Polarization Shift-Keying (DD-PolSK) System with Phase Modulators"; Friday Morning, vol. 2; pp. 647-649, 2003.

Betti et al.; "Phase Noise and Polarization State Insensitive Optical Coherent Systems"; Journal of Lightwave Technology, vol. 8, No. 5; pp. 756-767, May 1990.

Betti et al.; "Homodyne Optical Coherent Systems Based on Polarization Modulation"; Journal of Lightwave Technology, vol. 9, No. 10; pp. 1314-1320, Oct. 1991.

Heismann et al.; "Electrooptic Polarization Scramblers for Optically Amplified Long-Haul Transmission Systems"; IEEE Photonics Technology Letters, vol. 6, No. 9; pp. 1156-1158, Sep. 1994.

Benedetto et al.; "Multilevel Polarization Modulation Using a Specifically Designed LiNbO3 Device"; IEEE Photonics Technology Letters, vol. 6, No. 8; pp. 949-951, Aug. 1994.

* cited by examiner

MULTI-LEVEL POLARIZATION MULTI-LEVEL PHASE MODULATOR

TECHNICAL FIELD OF THE INVENTION

The present invention relates generally to optical computation systems, and more particularly to a multi-level modulator.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. Multiplexing can be used to increase the data rate in comparison to single stream transmission or to maintain the data rate but reduce the bandwidth requirements.

M-ary phase shift key modulation provides a shift in phase which can be used to multiplex two or more data streams. Likewise, polarization modulation provides a shift in polarization which can be used to multiplex two or more data streams. WDM and/or DWDM systems using polarization multiplexing and/or M-ary phase shift key may have increased spectral efficiency. For example, the wireless LAN standard, IEEE 802.11b-1999 uses a variety of phase shift key modulation schemes to increase efficiency. A system that incorporates both phase shift key modulation and polarization modulation may provide even more efficiency.

SUMMARY

In accordance with a particular embodiment of the present invention, an apparatus for use with an optical computation system may comprise a monolithic device with no free space optical components. The apparatus may include a phase modulator and a polarization modulator. The phase modulator may be configured to receive a beam of light and two digital data streams and operable to modulate the phase of the beam of light to at least four phase states, the at least four phase states representing the two digital data streams. The polarization modulator may be configured to receive two additional digital data streams and the modulated beam of light from the phase modulator and operable to modulate the polarization of the beam of light to at least four polarization states, the at least four polarization states representing the two additional digital data streams.

In accordance with another particular embodiment of the present invention, an optical computation system for transmitting an incoming signal may include a multi-level modulator to convert the incoming signal to a multiplexed signal, a coherent receiver, and a digital signal processor configured to demodulate the multiplexed signal. The multi-level modulator may comprise a monolithic device with no free space optical components and may include a phase modulator and a polarization modulator. The phase modulator may be configured to receive a beam of light and two digital data streams and operable to modulate the phase of the beam of light to at least four phase states, the at least four phase states representing the two digital data streams. The polarization modulator may be configured to receive two additional digital data streams and the modulated beam of light from the phase modulator and operable to modulate the polarization of the beam of light to at least four polarization states, the at least four polarization states representing the two additional digital data streams.

In accordance with another particular embodiment of the present invention, a method for multiplexing an incoming signal may include receiving an incoming beam of light, receiving at least four digital data streams, modulating the phase of the beam of light using at least four phase states to represent the first two digital data streams, and modulating the polarization of the beam of light using at least four polarization states to represent the second two digital data streams, and transmitting the multi-level modulated signal to a receiver. The method may include the phase modulator and polarization modulator cascaded on a monolithic device, the monolithic device including no free space optical components.

Technical advantages of one or more embodiments of the present invention may include providing increased spectral efficiency over alternative systems, allowing a 100 GHz transmission system to use a 50 GHz spaced DWDM transmission system. Known systems that incorporate polarization multiplexing require free space optical components that prevent monolithic design of the modulator. In contrast, one or more embodiments of the present invention eliminate the need for free space optical components. Therefore, such embodiments may provide increased spectral efficiency at a reduced cost and/or complexity.

It will be understood that the various embodiments of the present invention may include some, all, or none of the enumerated technical advantages. In addition, other technical advantages of the present invention may be readily apparent to one skilled in the art from the figures, description and claims included herein.

DETAILED DESCRIPTION

Optical computation systems may be implemented in optical networks to facilitate multiplexing and/or increased spectral efficiency (for example, networks implementing wavelength division multiplexing (WDM), dense wavelength division multiplexing (DWDM), or any other suitable multiplexing technique). Quadrature phase shift keying (QPSK) shifts the phase of the incoming signal. Rather than only signaling digital bits by turning a light on and off (e.g., zeroes and ones), a QPSK system shifts the phase of an optical carrier. Because there are four available phase states, a QPSK system may provide increased data flow efficiency compared to a signal with binary phase shift key (BPSK). By convention, the four phases typically used are at 45, 135, 225, and 315 degrees. Because there are four possible states, a QPSK system can be used to represent 2 digital bits. One example scheme codes as follows: 45 degrees is Binary 00; 135 degrees is Binary 01; 225 degrees is Binary 11; and 315 degrees is Binary 10. An alternative method of multiplexing may include modulating the polarity of an incoming light beam to provide additional signal states. In polarity modulation, the polarity of the signal may be represented by convention as 45 degrees, −45 degrees, right circular, or left circular (two orthogonal linear and two orthogonal circular polarizations). As with QPSK, each independent polarity may be designated to represent 2 digital bits. When QPSK and polarity modulation are combined, 4 digital bits can be carried by a single beam of light.

Figure 1:
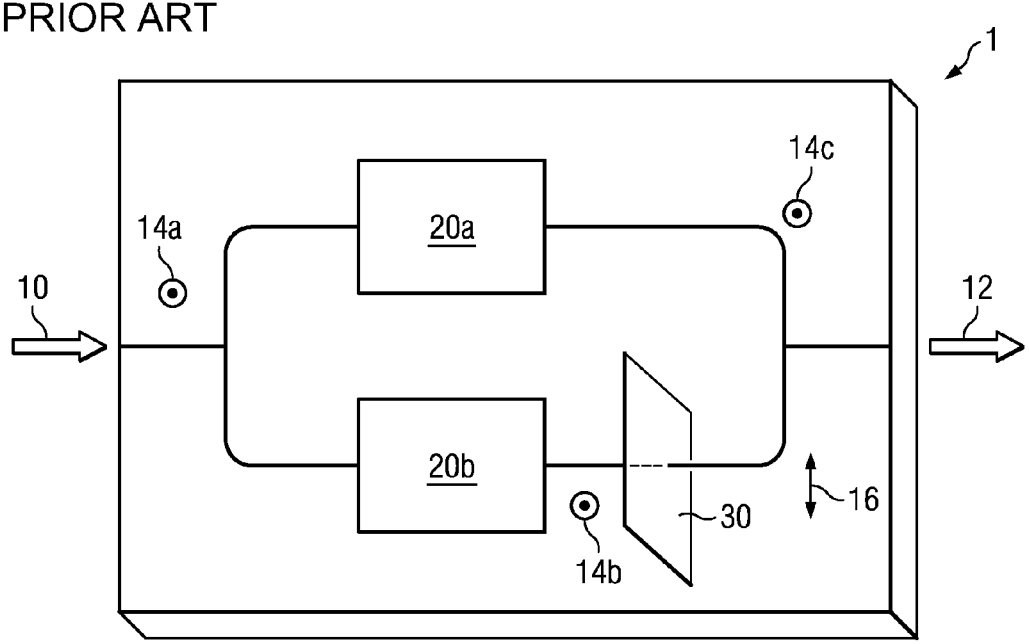
FIG. 1 illustrates a modulator that includes a half wave plate.
Figure 2:
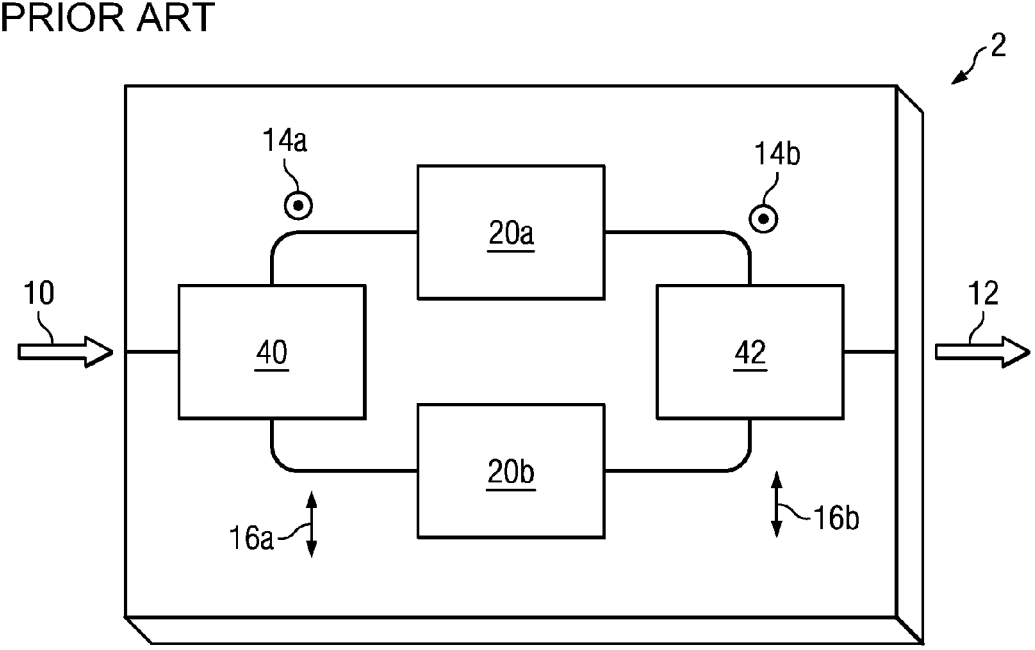
FIG. 2 illustrates a modulator that includes a free space polarization splitter and combiner.

FIGS. 1 and 2 show modulation schemes that may used in optical computation systems to implement multi-level modulation. Both of the modulation schemes shown include free space optical components. For example, FIG. 1 illustrates a modulator 1 with a half wave plate 30. U.S. patent application Ser. No. 10/052,886, entitled "System and Method for Multi-level Phase Modulated Communication," Publication No. 2004/0208646 describes the use of a half-wave plate to combine two phase modulated signals with orthogonal polarization and that disclosure is incorporated herein by reference.

Modulator 1 includes two quadrature phase shift keyed (QPSK) modulators 20a and 20b in parallel. In operation, incoming light beam 10 is split to the two QPSK modulators 20a and 20b. Incoming light beam 10 may be provided by a continuous wave laser or some other appropriate source. Each QPSK modulator 20 is configured to modulate a signal onto the light beam entering the QPSK. In QPSK modulation, the carrier signal may be split into two arms, the first of which, called the in-phase component (I), is phase modulated directly. The second arm, called the quadrature component (Q), may be phase modulated after an additional ninety degree phase. The two arms are superimposed to produce one QPSK signal.

As shown at arrow 14a, incoming light at 10 has a vertical polarity. Even after passing through QPSK modulators 20a and 20b, the light still has a vertical polarity. But, the modulated signal coming from QPSK modulator 20b is further passed through a half-wave plate 30. A half-wave plate rotates the polarization state of a light wave by shifting the phase between two perpendicular polarization components of the light wave. Light along the two different components travels through the half-wave plate at different speeds, creating a phase difference. These two separately polarized components may be referred to as the fast axis and the slow axis of travel.

As shown at arrow 16, the light beam exiting half-wave plate 30 has a horizontal polarity. When it is superimposed on the light beam exiting QPSK modulator 20a, there are two QPSK signals travelling in a single light beam 12, distinguishable by their different polarity.

As another example, FIG. 2 illustrates a modulator 2 that includes a free space polarization beam splitter (PBS) 40 and polarization beam combiner (PBC) 42, along with QPSK 20a and 20b. The input laser has two polarization components before incoming light 10 reaches PBS 40. For example, the input laser may be polarized 45 degrees with respect to the horizontal plane.

Both PBS 40 and PBC 42 may be free space optical components. One example PBS 40 is known as a Wollaston prism. A Wollaston prism separates unpolarized light (or randomly polarized light) into two orthogonal, linearly polarized outgoing beams. Outgoing light beams are separated into two polarized rays. PBC 42 superimposes two linearly polarized beams into a single output. Modulator 2, then, splits incoming light beam 10 into two polarized beams, one vertically polarized at arrow 14a and one horizontally polarized at arrow 16a. Each beam passes through QPSK modulators 20a and 20b without affecting the polarization shown at arrows 14b and 16b. As in the modulator shown in FIG. 1, the two beams are combined through PBC 42 into a single output 12. Output 12 includes two separate QPSK modulated signals distinguishable based on their polarity.

The type of modulation performed the modulators shown in FIGS. 1 and 2 may be referred to as DP-QPSK, indicating dual polarization-quadrature phase shift keying. The light beam 12 output actually includes two independent optical signals, one vertically polarized and the other horizontally, within a single beam. This method may be used to double spectrum efficiency over a QPSK system lacking polarization multiplexing. The combination of QPSK and polarization multiplexing transmits a bit rate four times faster than the apparent transmission rate (the symbol rate). In effect, there are two separate signals with different polarization (e.g., x-polarized and y-polarized) which each carry 2 bits of information in each pulse (e.g., through QPSK modulation).

The modulation systems shown in FIGS. 1 and 2, however, include free space optical components (e.g., the half wave plate and/or the PBS/PBC combination). Free space optical components add complexity to the manufacturing process for a DP-QPSK system. A multi-level polarization and multi-level phase modulator without free space optical components may achieve similar gains in efficiency without corresponding increases in cost and/or complexity.

Figure 3:
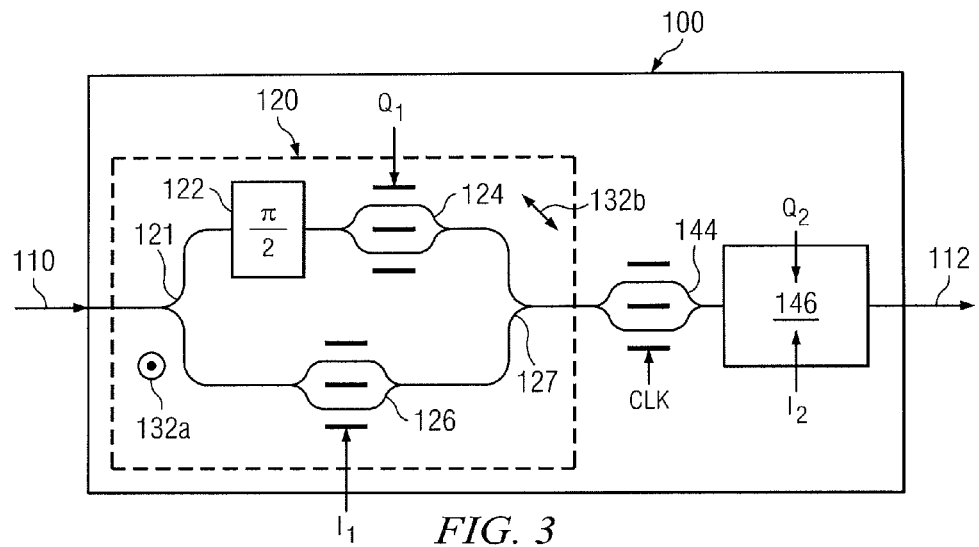
FIG. 3 illustrates a multi-level modulator incorporating teachings of the present disclosure.

FIG. 3 illustrates a multi-level polarization and multi-level phase modulator 100 incorporating teachings of the present disclosure and without any free space optical components. Modulator 100 may comprise a monolithic photonic integrated circuit (PIC). A monolithic PIC contains optical and electronic components (e.g., transistors, resistors, capacitors, and diodes) that are made in the body of a semiconductor wafer or on the surface of the wafer. Manufacture of a monolithic PIC may be preferred because all of the devices can be fabricated on a single wafer without additional fabrication steps such as bonding, wiring, and/or placement. A modulator with free space optical components cannot comprise a monolithic PIC because they must be added in a separate manufacturing process.

The monolithic modulator 100 of FIG. 3 may include phase modulator 120, pulse shaper 144, and polarization modulator 146. Pulse shaper 144 may not be used in a non-return-to-zero (NRZ) scheme. In operation, modulator 100 receives incoming light beam 110 and produces DP-QPSK modulated light beam 112.

Phase modulator 120 may include any appropriate PSK modulator that can be fabricated on monolithic modulator 100. For example, phase modulator 120 may include a Mach-Zehnder modulator (MZM). Phase modulator 120 may include a QPSK modulator, as shown in FIG. 3.

Incoming light beam 110 begins polarized vertical to the plane of modulator 100, as shown by the arrow 132a coming out of the page. Incoming light beam 110 is split at splitter 121 to enter two separate arms of phase modulator 120. At phase delay 122, the signal is shifted (e.g., delayed) by 90 degrees. The delay allows the two legs to be joined at combiner 127. The upper leg, passing through phase delay 122 and modulator 124, may be called the quadrature channel, or Q channel. The lower leg, passing through modulator 126 without a phase delay, may be called the in-phase channel, or I channel.

The electrical input to PSK modulator 120 may be through electrodes 124 and 126. The input for the Q channel may be applied to electrodes 124 and the input for the I channel may be applied to electrodes 126. The electrical input to electrodes 124 and 126 may affect the phase modulation discussed above by changing the refractive index of the waveguide. As the refractive index changes, the speed of a light beam passing through the waveguide also changes. In some PSK schemes, a positive phase shift represents a binary 1 and a negative phase shift represents a binary 0. In other PSK schemes, a light beam with no phase shift represents a binary 0 and a phase shift represents a binary 1.

If phase modulator 120 is a QPSK as shown in FIG. 3, the light beam entering pulse shaper 144 includes four phase states as discussed above. Pulse shaper 144 may include any component or device configured to perforin return-to-zero pulse shaping (RZ). RZ pulse shaping refers to a signal scheme in which the signal returns to zero between each pulse based on the clock signal (CLK) provided to pulse shaper 144. The CLK signal triggers a return-to-zero in the light beam passing through pulse shaper 144. In optical transmission systems, RZ pulse shaping may be performed by a MZM. Use of a RZ pulse shaper may provide greater margins for operation without interference between separate signals because only non-zero signal values are of interest. In contrast, non-return-to-zero (NRZ) refers to a signal without a zero or rest value.

Polarization modulator 146 may be any device, component, or feature of modulator 100 operable to generate multiple polarization states. For example, polarization modulator 146 may be operable to generate four polarization states: two orthogonal linear and two orthogonal circular polarizations. The electrical input to polarization modulator 146 may include two separate inputs similar to those described in relation to PSK modulation. For example, the electrical input may include two signals designated $I_2$ and $Q_2$ as shown in FIG. 3.

Figure 4A:
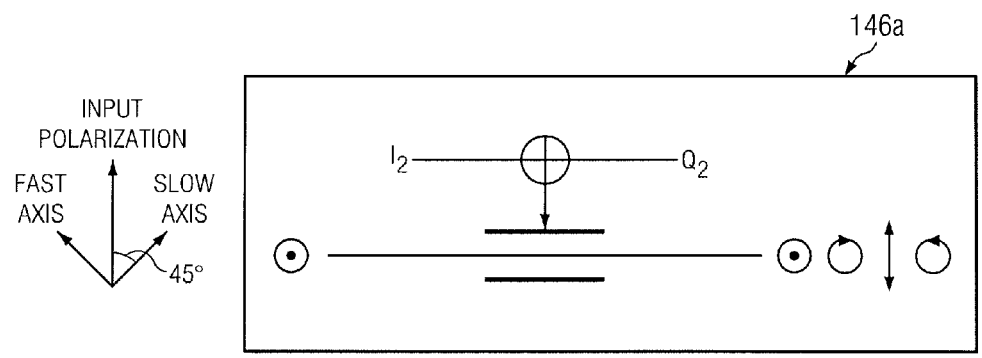
FIGS. 4A and 4B illustrate polarization modulation electrodes that may be used in accordance with teachings of the present disclosure.
Figure 4B:
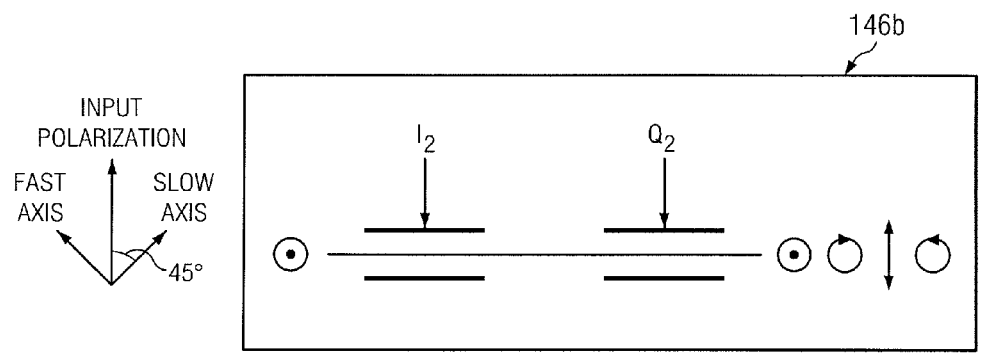

FIGS. 4A and 4B illustrate example polarization modulators 146a and 146b that may be used in accordance with teachings of the present disclosure. In the examples shown in FIGS. 4A and 4B, the light beam is launched with an angle of 45 degrees with respect to either the fast or the slow axis of polarization, as discussed above. In polarization modulator 146a, the I signal and the Q signal are applied through a single set of electrodes. In polarization modulator 146b, the I signal and the Q signal are applied through two separate sets of electrodes in series.

As discussed above, when the light beam enters polarization modulator 146a or 146b, it may linearly polarized along a single axis (e.g., as shown at vertical or normal to the page). The applied electrical signal may induce phase difference between two separate polarization components (e.g., a slow and fast axis component). The induced phase difference may change the polarization state of the light beam. For example, the I signal may induce a phase difference of either 0 or $\pi$ and the Q signal may include a phase difference of either 0 or $\pi/2$. In such an embodiment, the peak-to-peak voltage corresponding to the I signal and the Q signal may be different.

When a light beam exits polarization modulator 146, there are four separate potential polarities (e.g., two orthogonal linear and two orthogonal circular polarizations as shown in FIGS. 4A and 4B) depending at least in part on the value of $I_2$ and $Q_2$. Each polarity represents a discrete two-bit signal (e.g., 00, 01, 10, or 11) so that four potential polarities carry two data streams. This modulation scheme is unlike the earlier schemes that carry two separately polarized data streams in a single beam; here, instead, the polarity itself represents the data stream.

In contrast to the modulators which include free space optical components, the monolithic modulator 100 shown in FIG. 3 provides one signal that carries four bits of information in each pulse. Two bits are indicated by the PSK modulation and two bits are indicated by the polarization modulation; each modulation provides four possible states or data points. In this manner, light beam 112 exiting modulator 100 is a single beam carrying four bits of data rather than two separate light beams distinguished by their polarity as described in relation to FIGS. 1 and 2.

FIGS. 4A and 4B show example polarization modulation schemes 146a and 146b that may be used in accordance with teachings of the present disclosure. In both examples, an incoming signal is linearly polarized as shown by the arrow at left. The electric fields applied to affect the polarization modulation may be in a single set of electrodes as shown in FIG. 4A, or in a series of electrodes as shown in FIG. 4B.

Figure 5A:
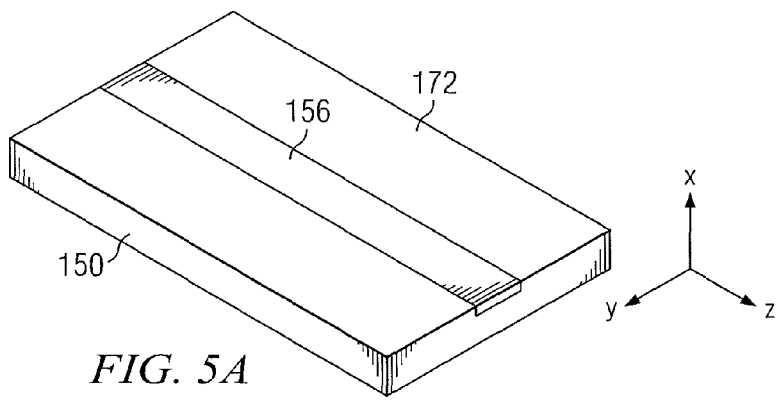
FIGS. 5A-5D illustrate embodiments of a polarization modulator that may be used in accordance with teachings of the present disclosure.

FIGS. 5A-5D show example embodiments of polarization modulator 146 that may be used in accordance with teachings of the present disclosure. FIG. 5A shows an embodiment of polarization modulator 146c including three electrodes 151, 152, and 153 on substrate 150. Substrate 150 may include an x-cut $LiNbO_3$ (Lithium Niobate) waveguide. Lithium Niobate crystals are known in the art for use in optical components because they have specific electro-optical, photoelastic, piezoelectric, and non-linear properties. In addition, devices on $LiNbO_3$ are known to offer reduced loss compared to other materials.

FIG. 5A shows a $LiNbO_3$ wave guide 156 on a substrate 150 in isometric view. As shown by the axes in FIG. 5A, the x-axis is perpendicular to the surface of the wave guide. One method for fabricating a wave guide may include diffusion of titanium or another appropriate dopant into the substrate surface 172. Titanium may be diffused using deposition and/or photolithographic techniques. The presence of a dopant may increase the refractive indices of the substrate in the regions of the dopant. A person having ordinary skill in the art would be able to cause optical wave propagation to be confined to a formed waveguide region by carefully designing the pattern of dopant deposition.

An article entitled, "Low Half-Wave Voltage X-Cut Thin $LiNbO_3$ Sheet Optical Phase Modulator With Asymmetric Coplanar Waveguide Electrode," written by K. Aoki et al., and published by IEEE Photonics Technology Letters, Vol. 20, No. 21, Nov. 1, 2008, and incorporated herein by reference, described the design and operation of one example polarization modulator applying electric voltage in a scheme that may be used to in polarization modulator 146. In that example, coplanar waveguide (CPW) electrodes made of gold were electroplated directly on top of an optical waveguide consisting Ti-diffused $LiNbO_3$. The application of an electric signal to those CPW electrodes affected the desired polarization shift described above.

The particular arrangement of electrodes 151, 152, and 153 may provide a polarization modulator for use with teachings of the present disclosure. Electrode 152 of polarization modulator 146c may be a ground electrode. The application of electrical signals through electrodes 151 and 153 may change the polarity of the light signal passing through modulator 146c.

Figure 5B:
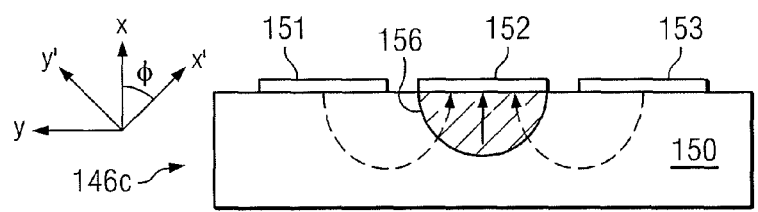

For example, the slow axis (x') and the fast axis (y') of waveguide 156 in an x-cut substrate 150 may rotate by angle Φ when an electric field is applied along the x-axis shown in FIG. 5B. The electric field applied may be selected such that Φ is 45 degrees. In such embodiments, a beam of light with linear polarization launched along the x-axis will experience a change of polarization state during propagation through waveguide 156 which depends at least in part on the magnitude of the applied electric field.

Figure 5C:
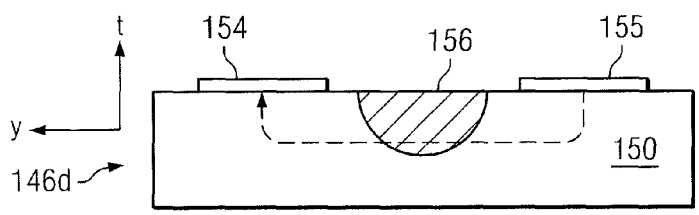

As another example, FIG. 5C shows an electric field applied along the y-axis of waveguide 156 in an x-cut LiNbO$_3$ substrate 150. In such embodiments, the fast and slow axes are aligned with the applied electric field. A beam of linearly polarized light launched with a 45 polarization with respect to the x-axis may experience a change of polarization status during its propagation through waveguide 156 which depends at least in part on the magnitude of the applied electric field.

Figure 5D:
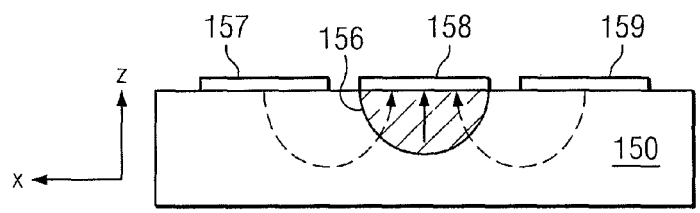

As another example, FIG. 5D shows an electric field applied along the z-axis of waveguide 156 in a z-cut LiNbO$_3$ substrate 150. In such embodiments, the fast axis and the slow axis are aligned with the z direction and the x direction of the applied electric field. A beam of linearly polarized light launched with a polarization state of 45 degrees with respect to the z-axis will experience a change of polarization state during its propagation through waveguide 156 which depends at least in part on the magnitude of the applied electric field.

Figure 6A:
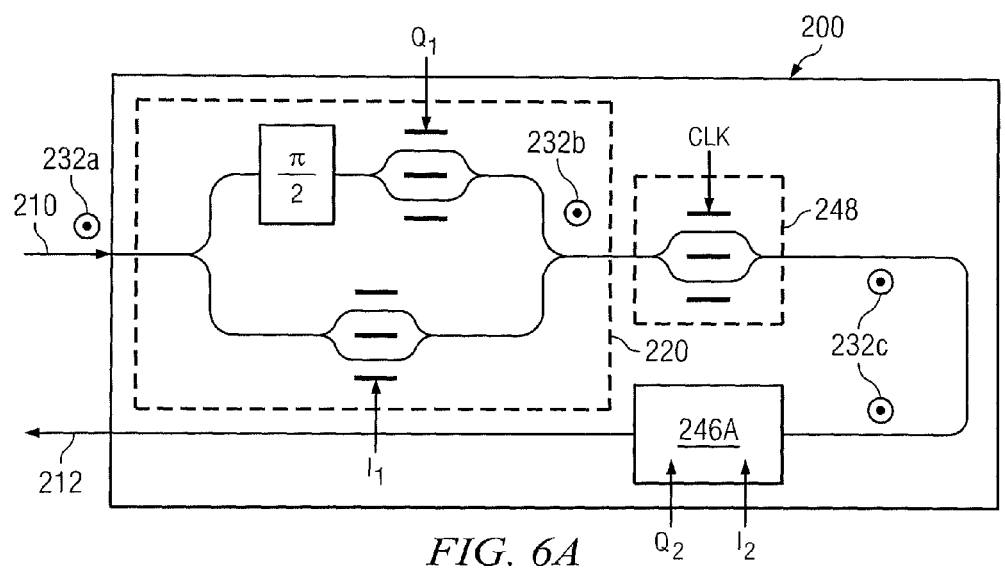
FIGS. 6A and 6B illustrate multi-level modulators that incorporate teachings of the present disclosure.

FIG. 6A shows the top view of a monolithic multi-level phase multi-level polarization modulator 200 that incorporates teachings of the present disclosure. Modulator 200 may include a phase modulator 220, a pulse shaper 248, and a polarization modulator 246a. In operation, modulator 200 receives an incoming light beam 210 which is polarized in the vertical direction as shown by arrow 232a. Phase modulator 220 may include a QPSK modulator as discussed above or may include any other PSK modulator. The light beam exiting phase key modulator 220 is still polarized in the vertical direction as shown at arrows 232b and 232c. Pulse shaper 248 may include an RZ pulse shaper as described in relation to FIG. 3. Polarization modulator 246a may include one or more of the arrangements discussed in relation to FIGS. 4A-5D. If the vertically polarized beam of light exiting pulse shaper 248 is redirected to polarization modulator 246a along the curved waveguide shown in FIG. 6A, polarization modulator 246a may be implemented using the configuration shown in FIG. 5A or FIG. 5B.

Figure 6B:
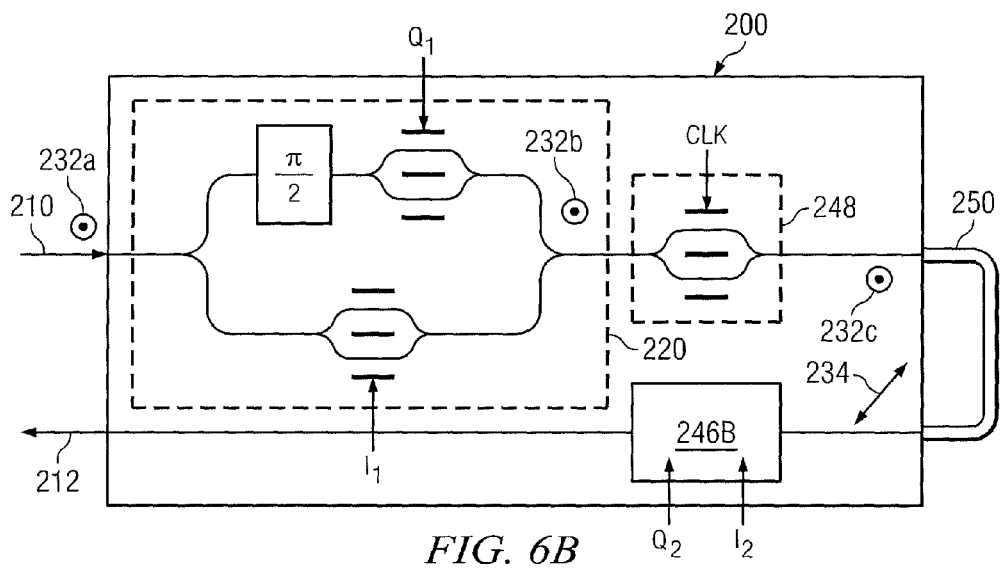

FIG. 6B shows the top view of a monolithic multi-level phase multi-level polarization modulator 200 that incorporates teachings of the present disclosure. Modulator 200 may include a phase modulator 220, a pulse shaper 248, a polarization modulator 246b, and a polarization fiber 250. Polarization modulator 246b may include one or more of the embodiments discussed in relation to FIGS. 4A-5D.

Polarization fiber 250 may include any device, component, and/or feature of modulator 200 configured to rotate the polarization of incoming signal 210 by 45 degrees with respect to vertical direction 232c, as indicated by arrow 234. For example, polarization fiber 250 may include polarization maintaining optical fiber (PM fiber) oriented to shift the polarization of an incoming signal by 45 degrees.

As shown in FIG. 6B, if vertically polarized light at 232c is launched into PM fiber 250 with its linear polarization aligned along the fast axis of PM fiber 250, the polarization state will be reserved in the fiber. If PM fiber 250 is arranged such that the fast axis of PM fiber 250 at the output is 45 degrees with respect to vertical, shown at arrow 234, the polarization of the light beam exiting PM fiber 250 will also be 45 degrees with respect to the vertical direction. If substrate 150 includes x-cut LiNbO$_3$, polarization modulator 245b may include embodiments shown in FIGS. 5A and/or 5B. If substrate 150 includes z-cut LiNbO$_3$, polarization modulator 245b may include embodiments shown in FIGS. 5A and/or 5D.

In operation, a multi level modulator incorporating teachings of the present disclosure may be in communication with a demodulator associated with a receiver. The demodulator may first determine the polarization status of a received signal, then reverse the polarization modulation. Various systems and devices for polarization diversity coherent optical receivers are known in the art.

For example, first, the polarization may be realigned using a constant modulus algorithm (CMA). Second, the polarization status may be detected and/or determined. Third, once the polarization status is determined, the polarization modulation can be reversed using software and/or a digital signal processor. At the end of this third step, the signal has a single polarization and includes only PSK modulation. Once the polarization multiplexing is undone, the receiver may implement a known process to demodulate the PSK modulation and recover data encoded with PSK.

Figure 7:
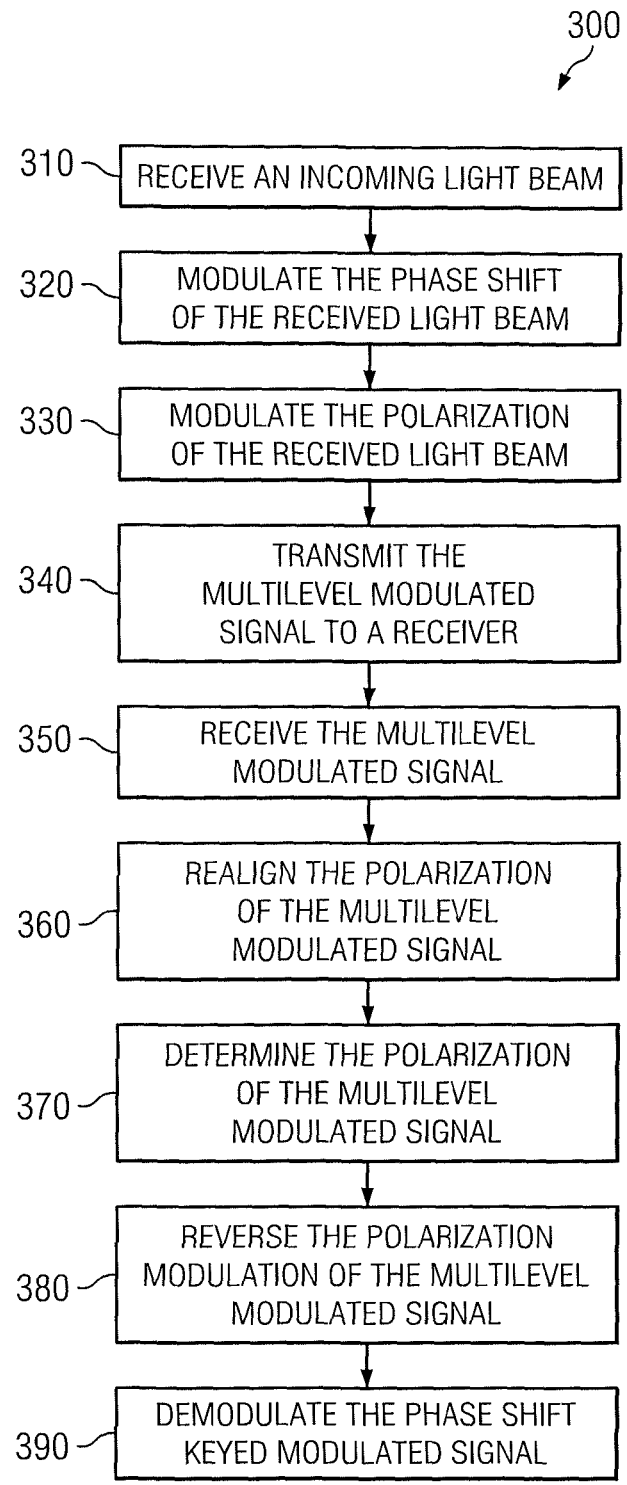
FIG. 7 illustrates a flow diagram for an example method which may be performed incorporating teachings of the present disclosure.

FIG. 7 illustrates a flow diagram for an example method 300 which may be performed incorporating teachings of the present disclosure. The various steps of method 300 may be performed in the order shown in FIG. 7, but may also be performed in alternative order, depending on the needs of the user and/or the system. Method 300 may be described herein as being performed by a multi-level modulator (e.g., modulator 100 and/or 200), but this description should not be read to limit the applications of the teachings of the present disclosure.

At step 310, a multi-level modulator may receive an incoming light beam. The incoming signal may be provided by a continuous wave laser or some other appropriate source.

At step 320, a phase modulator may modulate the phase of the received light beam. The phase modulator may be configured to provide four discrete phase states. For example, the phase modulator may be a QPSK modulator. In a QPSK modulator, the phase shift keying may depending on two incoming electric signals (e.g., $I_1$ and $Q_1$) applied to separate arms of the light beam before the separate arms are superimposed.

At step 330, a polarization modulator may modulate the polarization of the received light beam. The polarization modulator may be configured to provide four discrete polarization states, based at least in part on two incoming electrical signals (e.g., $I_2$ and $Q_2$). For example, the polarization modulator may provide 45 degree polarization, −45 degree polarization, right-hand circular modulation, and left-hand circular modulation.

At step 340, the multi-level modulator may transmit the multi-level modulated signal to a receiver. All of these steps may be performed by a monolithic IC including no free space optical components.

At step 350, the multi-level modulated signal may be received by a coherent optical receiver.

At step 360, the polarization of the multi-level modulated signal may be realigned using a constant modulus algorithm (CMA).

At step 370, the polarization status of the realigned multi-level modulated signal may be detected and/or determined. The polarization status may be converted into data based on the encoding performed at step 330.

At step 380, once the polarization status is determined, the polarization modulation can be reversed using software and/or a digital signal processor. At the end of step 380, the signal has a single polarization and includes only PSK modulation.

At step 390, the receiver may implement a known process to demodulate the PSK modulated signal and recover data encoded with PSK at step 320.

Although the present invention has been described with several embodiments, various changes and modifications may be suggested to one skilled in the art. It is intended that the present invention encompass such changes and modifications as fall within the scope of the appended claims. For example, method 300 may include passing the light beam through an optical fiber between one or more of the listed steps.

What is claimed is:

1. An apparatus for use with an optical computation system comprising:
   a phase modulator configured to receive a beam of light and two digital data streams;
   the phase modulator operable to modulate the phase of the beam of light to at least four phase states, the at least four phase states representing the two digital data streams;
   a polarization modulator configured to receive two additional digital data streams and the modulated beam of light from the phase modulator;
   the polarization modulator operable to modulate the polarization of the beam of light to at least four polarization states, the at least four polarization states representing the two additional digital data streams, the polarization modulator operable to modulate the polarization of the beam of light to represent the two additional digital data streams by changing the polarity of the beam of light passing through the modulator in response to the application of electrical signals applied through electrodes of the polarization modulator; and
   wherein the apparatus is a monolithic photonic integrated circuit and includes no polarization beam splitters.

2. An apparatus according to claim 1, wherein the phase modulator includes a quadrature phase shift key modulator.

3. An apparatus according to claim 1, further comprising a polarization modulating fiber configured to adjust the polarity of the modulated beam of light after it has exited the phase modulator.

4. An apparatus according to claim 1, further comprising a return-to-zero pulse shaper disposed to receive the modulated beam of light from the phase modulator before transmitting the modulated beam of light to the polarization modulator.

5. An apparatus according to claim 1, wherein the polarization modulator includes an x-cut or z-cut wave guide.

6. An apparatus according to claim 1, wherein the polarization modulator comprises an x-cut or z-cut wave guide made of $LiNbO_3$.

7. An apparatus according to claim 1, wherein the polarization modulator comprises an x-cut or z-cut wave guide including three electrodes.

8. An apparatus according to claim 1, wherein the polarization modulator comprises an x-cut wave guide including two electrodes.

9. An optical computation system for transmitting an incoming signal, the system comprising:
   a multi-level modulator to convert the incoming signal to a multiplexed signal comprising:
      a phase modulator configured to receive a beam of light and two digital data streams;
      the phase modulator operable to modulate the phase of the beam of light to at least four phase states, the at least four phase states representing the two digital data streams;
      a polarization modulator configured to receive two additional digital data streams and the modulated beam of light from the phase modulator; and
      the polarization modulator operable to modulate the polarization of the beam of light to at least four polarization states, the at least four polarization states representing the two additional digital data streams, the polarization modulator operable to modulate the polarization of the beam of light to represent the two additional digital data streams by changing the polarity of the beam of light passing through the modulator in response to the application of electrical signals applied through electrodes of the polarization modulator;
   wherein the multi-level modulator is a monolithic photonic integrated circuit and includes no polarization beam splitters.

10. A system according to claim 9, wherein the phase modulator includes a quadrature phase shift key modulator.

11. A system according to claim 9, further comprising a polarization modulating fiber configured to adjust the polarity of the modulated beam of light after it has exited the phase modulator.

12. A system according to claim 9, further comprising a return-to-zero pulse shaper disposed to receive the modulated beam of light from the phase modulator before transmitting the modulated beam of light to the polarization modulator.

13. A system according to claim 9, wherein the polarization modulator includes an x-cut or z-cut wave guide.

14. A system according to claim 9, wherein the polarization modulator comprises an x-cut or z-cut wave guide made of LiNbO3.

15. A system according to claim 9, wherein the polarization modulator comprises an x-cut or z-cut wave guide including three electrodes.

16. A system according to claim 9, wherein the polarization modulator comprises an x-cut wave guide including two electrodes.

17. A method for providing a multiplexed signal for use in an optical network, the method comprising
   receiving an incoming beam of light;
   receiving at least four digital data streams;
   using a phase modulator, modulating the phase of the beam of light using at least four phase states to represent the first two digital data streams;
   using a polarization modulator, modulating the polarization of the beam of light using at least four polarization states to represent the second two digital data streams, the polarization modulator operable to modulate the polarization of the beam of light to represent the two additional digital data streams by changing the polarity of the beam of light passing through the modulator in response to the application of electrical signals applied through electrodes of the polarization modulator; and
   transmitting the multi-level modulated signal;
   wherein the phase modulator and polarization modulator are cascaded on a monolithic device, the monolithic photonic integrated circuit including no polarization beam splitters.

18. A method according to claim 17, wherein modulating the phase of the beam of light is performed before modulating the polarization of the beam of light first.

* * * * *